United States Patent
Stoll et al.

(10) Patent No.: US 10,490,993 B2
(45) Date of Patent: Nov. 26, 2019

(54) WIND-PROTECTION CASING AND PLUG-CONNECTOR DEVICE COMPRISING SAME

(71) Applicants: Viktor Stoll, Großkrotzenburg (DE); Stephan Mann, Biebergemünd (DE); Benjamin Weber, Aschaffenburg (DE); Thomas Petschl, Neuberg (DE)

(72) Inventors: Viktor Stoll, Großkrotzenburg (DE); Stephan Mann, Biebergemünd (DE); Benjamin Weber, Aschaffenburg (DE); Thomas Petschl, Neuberg (DE)

(73) Assignee: NORMA Germany GmbH, Maintal (DE)

( * ) Notice: Subject to any disclaimer, the term of this patent is extended or adjusted under 35 U.S.C. 154(b) by 0 days.

(21) Appl. No.: 15/747,959

(22) PCT Filed: May 17, 2016

(86) PCT No.: PCT/EP2016/060994
§ 371 (c)(1),
(2) Date: Jan. 26, 2018

(87) PCT Pub. No.: WO2017/016697
PCT Pub. Date: Feb. 2, 2017

(65) Prior Publication Data
US 2018/0226783 A1  Aug. 9, 2018

(30) Foreign Application Priority Data

Jul. 30, 2015  (DE) .......................... 10 2015 112 519

(51) Int. Cl.
*H02G 15/113* (2006.01)
*F16L 59/18* (2006.01)
(Continued)

(52) U.S. Cl.
CPC ....... *H02G 15/113* (2013.01); *B60R 16/0215* (2013.01); *F16L 57/00* (2013.01);
(Continued)

(58) Field of Classification Search
CPC ........... H01R 13/6392; H01R 13/6395; H01R 13/62; H01R 13/6397
(Continued)

(56) References Cited

U.S. PATENT DOCUMENTS

| 3,183,302 A | 5/1965 | Wochner |
| 4,643,505 A | 2/1987 | House et al. |

(Continued)

FOREIGN PATENT DOCUMENTS

| DE | 202004002950 U1 | 7/2005 |
| DE | 102005050867 A1 | 4/2007 |

(Continued)

OTHER PUBLICATIONS

International Search Report for International Application No. PCT/EP2016/060994, dated Sep. 2, 2016.

(Continued)

*Primary Examiner* — Phuong Chi T Nguyen
(74) *Attorney, Agent, or Firm* — Marshall, Gerstein & Borun LLP

(57) ABSTRACT

A wind-protection casing includes a plastic shell having a first partial shell and a second partial shell, wherein the first partial shell and the second partial shell surround an accommodating space and form a first and second line opening, which connect the accommodating space with the surrounding region outside the accommodating space. A retaining means is provided with an accommodating geometry for a line plug connector, which is arranged on the first partial shell and is designed in such a way that a line plug connector accommodated by the accommodating geometry is retained (Continued)

in the accommodating space at a distance from the first partial shell and the second partial shell via an air gap. A plug-connector device including such a wind-protection casing of this type is also provided, wherein a line plug connector is accommodated in the accommodating geometry.

13 Claims, 3 Drawing Sheets

(51) Int. Cl.
    *F16L 57/00* (2006.01)
    *H01R 13/533* (2006.01)
    *B60R 16/02* (2006.01)
    *H01R 13/639* (2006.01)
    *B60S 1/48* (2006.01)

(52) U.S. Cl.
    CPC ............ *F16L 59/18* (2013.01); *H01R 13/533* (2013.01); *H01R 13/639* (2013.01); *B60S 1/48* (2013.01); *H01R 13/6392* (2013.01)

(58) Field of Classification Search
    USPC .................................. 439/369, 367, 368, 371
    See application file for complete search history.

(56) References Cited

U.S. PATENT DOCUMENTS

| | | | |
|---|---|---|---|
| 5,691,508 A * | 11/1997 | Radliff | H01R 4/646 174/92 |
| 5,755,588 A | 5/1998 | Sweatman et al. | |
| 7,307,219 B1 | 12/2007 | Dower et al. | |
| 10,065,342 B2 * | 9/2018 | Hirooka | B29C 33/12 |
| 2009/0211747 A1 * | 8/2009 | Lynde | E21B 31/00 166/65.1 |
| 2015/0014490 A1 | 1/2015 | Sugimoto et al. | |

FOREIGN PATENT DOCUMENTS

| | | |
|---|---|---|
| DE | 202008003294 U1 | 7/2009 |
| DE | 202011050660 U1 | 10/2012 |
| EP | 1780855 A2 | 5/2007 |
| GB | 1413650 A | 11/1975 |
| JP | H0262688 | 5/1990 |
| JP | H0393421 | 4/1991 |
| JP | 2000-003756 A | 1/2000 |
| JP | 2009-261046 A | 11/2009 |
| WO | WO-20120167326 A1 | 12/2012 |

OTHER PUBLICATIONS

First Office Action, Application No. DE 10 2015 112 519.6, dated Mar. 1, 2016.

Office Action, Japanese patent application 2018-503490, dated Feb. 5, 2019.

English Translation of Office Action, Korean Patent Application No. 10-2018-7006095, dated May 31, 2019.

* cited by examiner

WIND-PROTECTION CASING AND PLUG-CONNECTOR DEVICE COMPRISING SAME

CROSS-REFERENCE TO RELATED APPLICATIONS

This is the United States national phase of International Patent Application No. PCT/EP2016/060994, filed May 17, 2016, which claims the priority benefit of German Application No. 102015112519.6, filed Jul. 30, 2015, the entire content of each of which is incorporated herein by reference.

BACKGROUND

The invention relates to a wind-protection casing and to a plug-connector device with a wind-protection casing.

Wind-protection casings serve in particular for protecting plug connections between lines from the wind, and accompanying cold. Plug connections form a pluggable connection between two conductor portions. The conductor portions may be electrical conductors or hydraulic conductors. Often, for example in automobile construction, electrical conductors and hydraulic conductors are also combined in a conductor harness. This includes the washer-fluid lines that are integrated in cable harnesses.

The plug connections are particularly susceptible to cold, and the fluid in the hydraulic lines may freeze. Line plug connectors of electrical conductor portions usually comprise hard materials and, when vibrations occur, may generate rattling and knocking noises by colliding with other line plug connectors or peripheral components. However, for great ease of maintenance, it is not possible to dispense with the line plug connectors.

In the prior art, in particular in vehicle construction, wind-protection tubes are used as wind-protection casings. These flexible wind-protection tubes are pushed over the line plug connectors, for which purpose they usually first have to be pushed onto one of the conductor portions to be connected while the line plug connectors are open. A disadvantage of this is that they can only poorly position electrical cables, including the line plug connectors, and hydraulic line plug connectors. There is the risk of noises, for example rattling noises, occurring as a result. Furthermore, wind-protection tubes partly lie against the line plug connector, whereby cold bridges are formed. As a result, fluids in hydraulic connectors can freeze, or at least become very viscous.

A further disadvantage is that of uncontrolled installation. The wind-protection tube is first brought approximately into position, and then usually a cable tie is tightened around the ends. The tightening torque is scarcely predeterminable, and so either air gaps are left or conductors are pinched. Depending on how bunches of conductors happen to turn out, the connection may loosen again later and the wind-protection tube slip. Furthermore, during installation/removal, the ends of the tubes have to be turned back, which requires manual dexterity and time. In the case of maintenance, it is disadvantageous that the wind-protection tube has to be pushed back in order to get to the individual line plug connectors.

Alternative protection for at least one electrical connector is disclosed by U.S. Pat. No. 7,307,219 B1, according to which two half-shells are used, forming a casing with an interior cavity when they are placed together. The openings of the half-shells are respectively spanned by an elastomer membrane. When the electrical connector is placed between the half-shells and they are closed, the two membranes are deformed around the electrical connector. It is disadvantageous that to realize this it is necessary for there to be a relatively large box around the electrical connector. If a number of line plug connectors are placed between the membranes, they can in turn collide with one another and cannot be properly positioned in relation to one another. Furthermore, the membranes represent heat bridges, which lead from the housing casing directly to the electrical connector. The casing according to U.S. Pat. No. 7,307,219 B1 therefore tends to be unsuitable for multiple line plug connectors or hydraulic connectors.

Furthermore, a casing consisting of two half-shells is disclosed by GB 1 413 650 A. The two half-shells exactly follow the geometry of the electrical conductors and connectors to be received. The half-shells are placed around them and then connected to one another by screws at a flanged edge. It is disadvantageous that there is a great heat bridge, and so this design is not suitable for hydraulic line plug connectors at low temperatures.

GENERAL DESCRIPTION

The object is therefore to provide a device that is suitable for preventing the development of noise in the region of line plug connectors and for protecting hydraulic line plug connectors from low temperatures. Furthermore, it is intended to be compact, able to be installed easily and correctly, easy to maintain and also inexpensive.

The invention relates to a wind-protection casing comprising a plastic shell, which has a first part-shell and a second part-shell, the first part-shell and the second part-shell enclosing a receiving space and forming a first and a second line opening, which connect the receiving space to the surrounding region outside the receiving space. The plastic shell also has a holding means with a receiving geometry for at least one line plug connector, which is arranged on the first part-shell and is formed in such a way that a line plug connector received by the receiving geometry is held in the receiving space at a distance from the first part-shell and the second part-shell by an air gap.

An advantage of such a design is the replacability of wind-protection tubes. Preinstallation on one side or in one part-shell is possible, and can be easily handled. A durable and exact positioning of the line plug connector in the wind-protection casing is achieved. The distance has the effect of forming an air cushion around the plug connector contour, which is thermally insulated. Furthermore, rattling noises are prevented, since the line plug connector is in a defined position of the receiving geometry and cannot collide with other components.

In a preferred inexpensive design, the holding means is formed in one piece, in particular monolithically, with the first part-shell. Easy and quick installation is accomplished in particular in accordance with an optional design in which the first and second line openings are arranged in the parting plane between the first and second part-shells.

Moreover, the first and second part-shells should follow the outer contour of the line plug connector or connectors. This ideally produces a wind-protection casing that has two narrow ends with the conductor openings and in between a thickening in at least one spatial direction. The maximum thickening preferably lies in the plane of the parting plane. This facilitates installation by the line plug connector or connectors being placed in.

According to a more specific embodiment of the wind-protection casing, the first and second part-shells are coupled to one another by way of a rotary joint, so that the first and second part-shells can be swung open and swung shut in relation to one another. This makes easy and ergonomic handling possible. An inexpensive variant is achieved if the rotary joint is a film hinge.

According to a specific kind of embodiment of the wind-protection casing, the holding means is formed by a rib. The rib at the same time stiffens the part-shells and prevents them from deforming. The rib preferably runs transversely in relation to the alignment of the line plug connector. The ribs can then introduce tensile forces acting on the line plug connector into the plastic casing.

Furthermore, the wind-protection casing may optionally have actuable latching means, with which the first and second part-shells can be closed together to form the receiving space. This makes it possible for installation to be performed without any tools. Depending on the design, removal involving tools or removal without any tools can be realized. The latching means preferably comprise first latching means on the first part-shell and second latching means on the second part-shell. Production is inexpensive in particular if the first latching means are formed in one piece, in particular monolithically, with the first part-shell, and the second latching means are formed in one piece, in particular monolithically, with the second part-shell.

An additional feature of the wind-protection casing may be that the receiving geometry has a first plugging means. Plug-like attachment of the line plug connector leads to clear positioning and can be easily carried out from a single direction. Insertion bevels that facilitate installation are preferably provided on the first plugging means or the counterpart.

In a variant of the wind-protection casing, a seal is formed and/or arranged between the first part-shell and the second part-shell. This is accomplished by sealing surfaces lying mechanically against one another or by an elastic seal. Consequently, wind does not get into the wind-protection casing. Seals, in particular elastic sealing sleeves, may also be provided in the region of the line openings.

Furthermore, a more specific design of the wind-protection casing provides that a holddown device is arranged on the second part-shell and is formed in such a way that a line plug connector received by the receiving geometry is held in the receiving geometry when the receiving space is closed by the first and second part-shells. As a result, with the closing of the plastic shell, the line plug connector is securely kept in position, since it was possible for it to be quickly pre-installed in advance by being placed in the first part-shell. It is inexpensive if the holddown device is formed in one piece, in particular monolithically, with the second part-shell. Great stiffness of the wind-protection casing is achieved if the holddown device is formed by a rib.

A special embodiment for cold areas of use is supplemented by an electrically operated heating element being arranged in the receiving space. This is preferably operated as frost protection heating in relation to the fluid that is present in the line plug connector.

To allow the wind-protection casing to be fixed correctly and durably at an intended location, it is appropriate for it to be supplemented in such a way that the plastic shell has a fastening means for fixing on another component. This fastening means may be for example a clip contour, a latching means or a tab with an opening.

The invention also relates to a plug-connector device comprising a wind-protection casing in one of the variants described above, a line plug connector having been received in the receiving geometry. This subject matter of the invention is also suitable for providing a way in which a line plug connector can be received in a noise-avoiding and insulating manner, the plug-connector device being inexpensive and easy to handle.

In a more specific design of the plug-connector device, the receiving geometry has a first plugging means and the line plug connector has a second plugging means, the first and second plugging means forming a mechanical plug connection. Plug-like attachment of the line plug connector can be carried out quickly and clear positioning is achieved.

In a more specific embodiment, the line plug connector forms a plug connection between a first and a second conductor portion, the first conductor portion being led through the first line opening and the second conductor portion being led through the second line opening out of the receiving space into the surrounding region. The plug-connector device is particularly suitable if the first and second conductor portions are electrical conductor portions and/or hydraulic conductor portions.

In a particular variant of the plug-connector device, the line plug connector connects two hydraulic conductor portions to one another, and a second line plug connector is arranged in the receiving space at a distance from the first line plug connector provided in particular by an air gap. Consequently, not only are multiple line plug connectors accommodated in the same wind-protection casing in a space-saving manner, but also the hydraulic line plug connector is thermally insulated from the second line plug connector by an air cushion.

In a preferred embodiment of the plug-connector device, the air gap around the line plug connector is of a substantially uniform size. Consequently, the thermal insulation is formed homogeneously in all directions.

BRIEF DESCRIPTION OF THE DRAWINGS

Further features, details and advantages of the invention arise from the wording of the claims and from the following description of exemplary embodiments on the basis of the drawings, in which:

DETAILED DESCRIPTION

Figure 1:
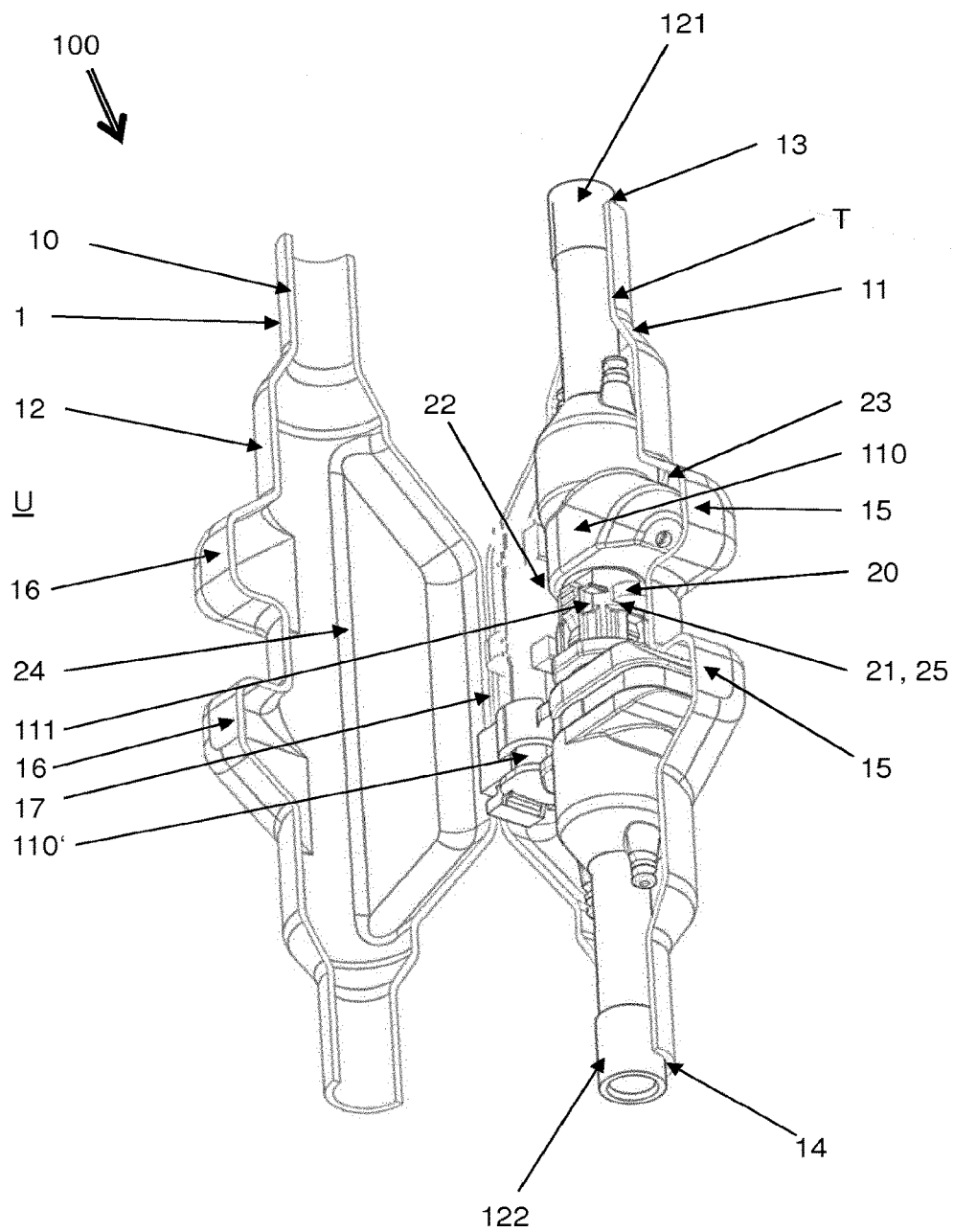
FIG. 1 shows a perspective view of a plug-connector device with an open plastic shell of a wind-protection casing.

In FIG. 1, a plug-connector device 100 with an open plastic shell 10 of a wind-protection casing 1 can be seen in a perspective view.

The plastic shell consists of a first part-shell 11 and a second part-shell 12, which—as soon as they are closed—enclose a receiving space 22. Furthermore, the two part-shells 11, 12 form in the parting plane T a first and a second line opening 13, 14, which are positioned in particular at opposite ends of the elongate plastic shell 10. The first and second line openings 13, 14 connect the receiving space 22 to the surrounding region U outside the receiving space 22.

Furthermore, the first and second part-shells 11, 12 are coupled to one another by way of a rotary joint 17, in particular a film hinge, so that the first and second part-shells 11, 12 can be swung open and swung shut in relation to one another. In order to keep the part-shells 11, 12 in the swung-shut position, actuable latching means 15, 16 are provided, with which the first and second part-shells 11, 12 can be closed together. In this case, first latching means 15 are formed on the first part-shell 11 and second latching means 16 are formed on the second part-shell 12, this taking place in particular monolithically in one piece with the respective one of the part-shells 11, 12.

Inside the plastic casing 10 there can be seen a holding means 20 with a receiving geometry 21 for a likewise shown line plug connector 110. The holding means 20 is arranged on the first part-shell 11 and is formed in such a way that the line plug connector 110 received in the receiving geometry 21 is held in the receiving space 22 at a distance from the first part-shell 11, and in the closed position also from the second part-shell 12, by an air gap 23. The holding means 20 is formed in one piece, in particular monolithically, with the first part-shell 11. This is particularly a rib with clearances. The rib forms with the clearances a receiving geometry 21, the clearances especially forming a first plugging means 25.

The line plug connector 110 has a corresponding second plugging means 111, with which it is plugged together with the first plugging means 25, whereby a mechanical plug connection is obtained.

It can also be seen that the line plug connector 110 forms a plug connection between a first and a second conductor portion 121, 122. The first conductor portion 121 is led through the first line opening 13 and the second conductor portion 122 is led through the second line opening 14 out of the receiving space 22 into the surrounding region U.

Arranged on the second part-shell 12 is a holddown device 24, which is formed monolithically in one piece with the second part-shell 12. The holddown device 24 is also in particular a rib with clearances. If the second part-shell 12 is closed apart from the receiving space 22 by being swung shut, the holddown device 24 holds the line plug connector 110 in the receiving geometry 21.

The first and second conductor portions 121, 122 are electrical conductor portions and hydraulic conductor portions. The line plug connector 110 connects in particular the hydraulic conductor portions 121, 122. The electrical conductor portions 121, 122 are connected to one another by way of a second line plug connector 110', which is aligned substantially parallel to the first line plug connector 110. The second line plug connector 110' is also held in the plastic shell 10 by the holding means 20 and the holddown device 24. In this case, the second line plug connector 110' is arranged in the receiving space at a distance from the first line plug connector 110 by an air gap.

The outer contour of the plastic shell 10 substantially follows the components received inside, so that the air gap 23 around the line plug connector 110 and the second line plug connector 110' is of a substantially uniform size.

Figure 3:
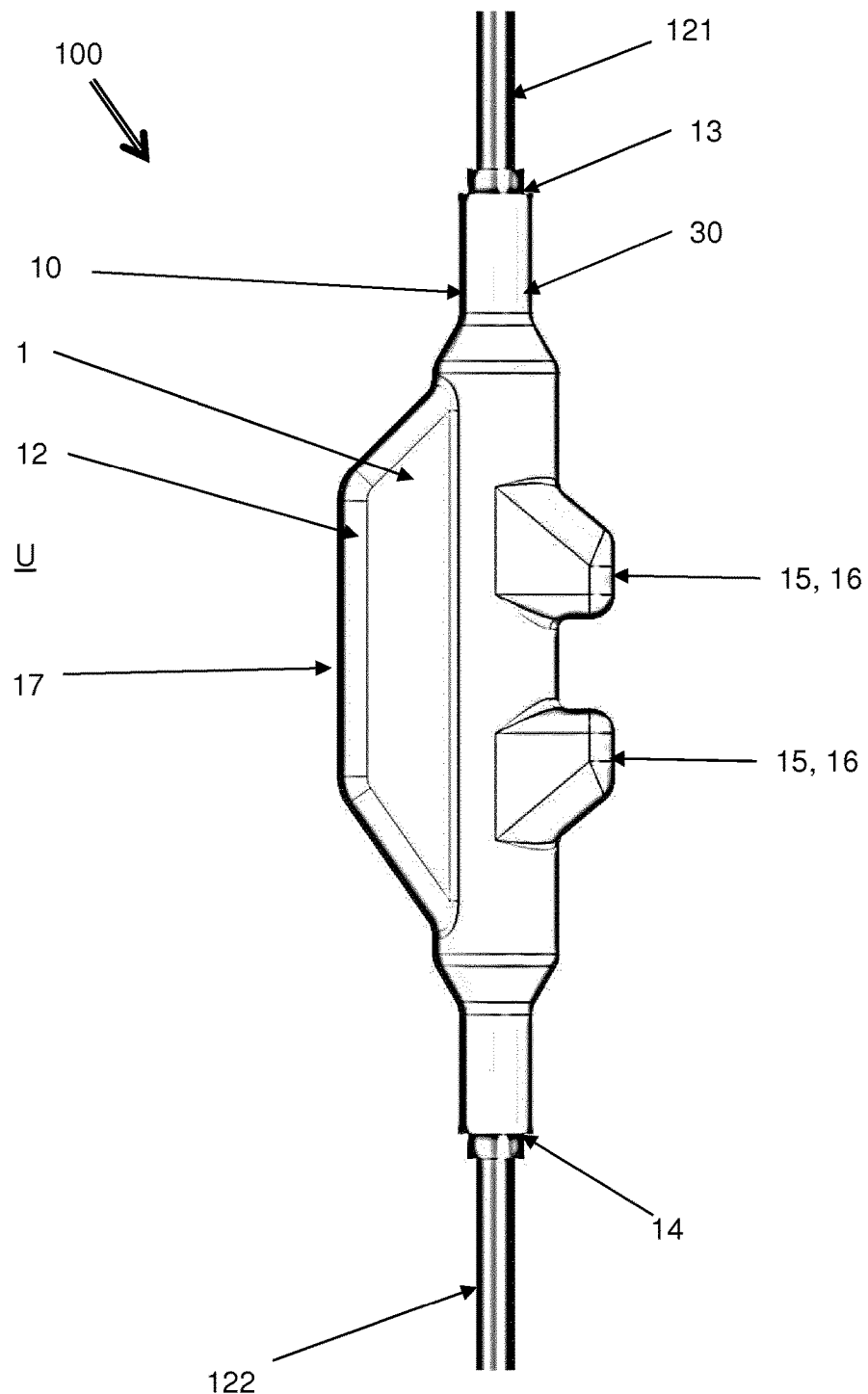
FIG. 3 shows the plastic shell shown in FIG. 1 in the closed position.

According to FIG. 3, the second part-shell 12 has been turned about the rotary joint 17, so that the first and second part-shells 11, 12 are closed in relation to one another. With the exception of the line openings 13, 14, the first and second part-shells 11, 12 lie against one another in the parting plane T. As a result, a seal 30 is formed between the first part-shell 11 and the second part-shell 12. In this closed position, the latching means 15, 16 are in engagement with one another and keep the plastic shell 10 closed and the line plug connectors 110, 110' in position.

Figure 2:
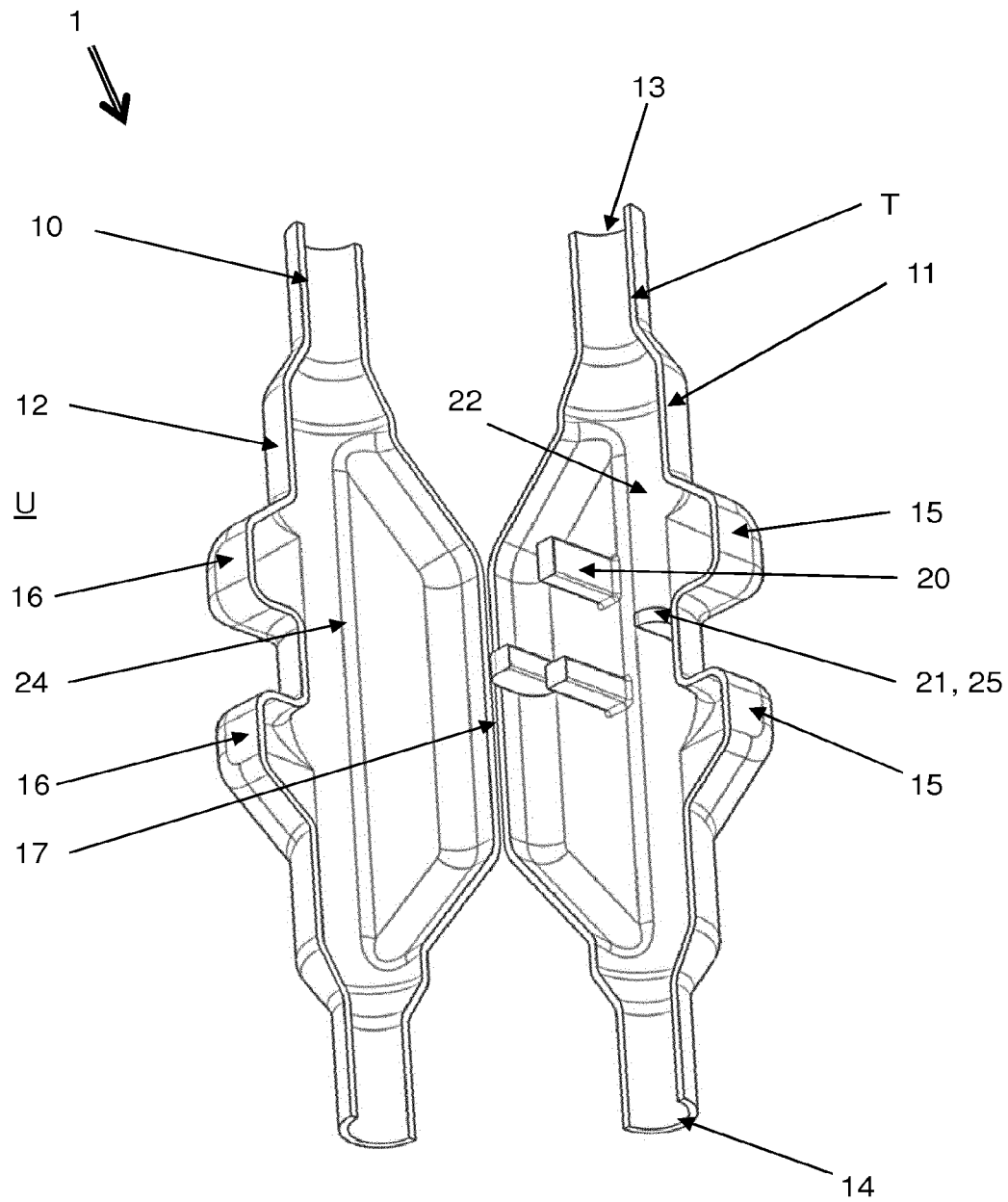
FIG. 2 shows a perspective view of the wind-protection casing shown in FIG. 1.

In FIG. 2, the wind-protection casing 1 as in FIG. 1 is shown once again on its own. The statements made in relation to FIG. 1 that concern the wind-protection casing 1 also apply correspondingly to FIG. 2.

The invention is not restricted to one of the embodiments described above, but can be modified in various ways.

Thus, for example, an electrically operated heating element may optionally be arranged in the receiving space 22. The plastic shell 10 may also be equipped with a fastening means for fixing on another component.

All of the features and advantages that emerge from the claims, the description and the drawing, including structural design details, spatial arrangements and method steps, may be essential to the invention both on their own and in a wide variety of combinations.

The invention claimed is:

1. A wind-protection casing (1) comprising a plastic shell (10),
   which has a first part-shell (11) and a second part-shell (12),
   the first part-shell (11) and the second part-shell (12) enclosing a receiving space (22) and
   forming a first and a second line opening (13, 14), which connect the receiving space (22) to the surrounding region (U) outside the receiving space (22),
   characterized by
   a holding element (20) with a receiving geometry (21) for a line plug connector (110),
   which is arranged on the first part-shell (11) and
   is formed in such a way that a line plug connector (110) received by the receiving geometry (21) is held in the receiving space (22) at a distance from the first part-shell (11) and the second part-shell (12) by an air gap (23), the air gap extending around the line plug connector.

2. The wind-protection casing (1) as claimed in claim 1, wherein the first and second part-shells (11, 12) are coupled to one another by way of a rotary joint (17), so that the first and second part-shells (11, 12) can be swung open and swung shut in relation to one another.

3. The wind-protection casing (1) as claimed in claim 1, wherein the holding element (20) is formed by a rib.

4. The wind-protection casing (1) as claimed in claim 1, wherein the receiving geometry (21) has a first plugging means (25).

5. The wind-protection casing (1) as claimed in claim 1, wherein a holddown device (24) is arranged on the second part-shell (12) and is formed in such a way that a line plug connector (110) received by the receiving geometry (21) is held in the receiving geometry (21) when the receiving space (22) is closed by the first and second part-shells (11, 12).

6. The wind-protection casing (1) as claimed in claim 1, wherein an electrically operated heating element is arranged in the receiving space (22).

7. The wind-protection casing (1) as claimed in claim 1, wherein the plastic shell (10) has a fastening means for fixing on another component.

8. A plug connector device (100) comprising:
   a wind protection casing (1) comprising a plastic shell (10),
      which has a first part-shell (11) and a second part-shell (12),
      the first part-shell (11) and the second part-shell (12) enclosing a receiving space (22), and forming a first and a second line opening (13,14), which connect the receiving space (22) to the surrounding region (U) outside the receiving space (22),
   characterized by
   a holding element (20) with the receiving geometry (21) for the line plug connector (110), which is arranged on the first part-shell (11) and
is formed in such a way that the line plug connector (110) received by the receiving geometry (21) is held in the receiving space (22) at a distance from the first part-shell (11) and the second part-shell (12) by an air gap (23), the air gap extending around the line plug connector,
a line plug connector (110) having been received in the receiving geometry (21).

9. The plug-connector device (100) as claimed in claim 8, wherein the receiving geometry (21) has a first plugging means (25) and the line plug connector (110) has a second plugging means (111), the first and second plugging means (25, 111) forming a mechanical plug connection.

10. The plug-connector device (100) as claimed in claim 8, the line plug connector (110) forms a plug connection between a first and a second conductor portion (121, 122), the first conductor portion (121) being led through the first line opening (13) and the second conductor portion (122) being led through the second line opening (14) out of the receiving space (22) into the surrounding region (U).

11. The plug-connector device (100) as claimed in claim 8, wherein the air gap (23) around the line plug connector (110) is of a substantially uniform size.

12. The plug-connector device (100) as claimed in claim 10, wherein the first and second conductor portions (121, 122) are electrical conductor portions and/or hydraulic conductor portions.

13. The plug-connector device (100) as claimed in claim 10, wherein the line plug connector (110) connects two hydraulic conductor portions to one another, and a second line plug connector (110') is arranged in the receiving space at a distance from the first line plug connector (110).

* * * * *